Sept. 18, 1928.

L. H. SPRINKLE

ARTIFICIAL TOOTH

Filed April 16, 1927

1,684,523

Inventor
Lake H. Sprinkle
By his Attorney
Israel Benjamins.

Patented Sept. 18, 1928.

1,684,523

UNITED STATES PATENT OFFICE.

LAKE H. SPRINKLE, OF BROOKLYN, NEW YORK.

ARTIFICIAL TOOTH.

Application filed April 16, 1927. Serial No. 184,330.

My invention relates to artificial teeth and facings, made of porcelain or any other suitable material, and it consists in the novel features, which are hereinafter described.

One of the objects of my invention is—to do away with metal pins, which are at present employed for connecting the body of a tooth or facing to a plate or backing.

Another object of my improvement is—to produce an improved artificial tooth or facing having the root thereof formed into a projection or pin with a head thereon, for connecting the same to a plate or backing.

A further object of my improvement is to produce a perfected tooth or facing, having on the lingual side thereof pins made of porcelain and baked into the body of the tooth or facing by any suitable process, or made integral therewith, if desired, thereby obviating the corrosion, due to metal pins, or other imperfections of the same.

Another object of my improvement is—to have pins on the lingual side of artificial teeth of a much larger diameter than is feasible with metal pins, thereby affording a larger bearing surface for said pins in a plate or backing.

A further object of my invention is to prevent discoloring and reduction of the translucence of the teeth by metal pins in the process of burning said teeth in the furnace.

Other objects and advantages will hereinafter appear.

I attain these objects by the artificial tooth, one form of which is illustrated in the accompanying drawings, or by any mechanical equivalent or obvious modification of the same.

Figure 1:
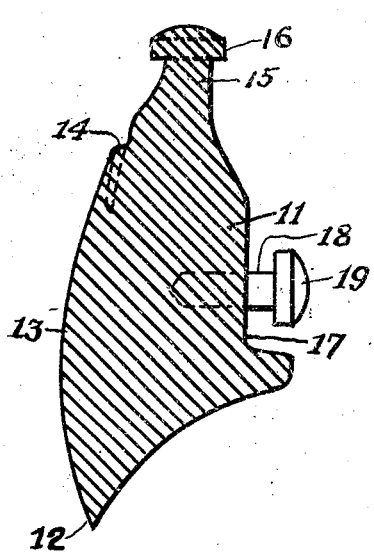
Figure 2:
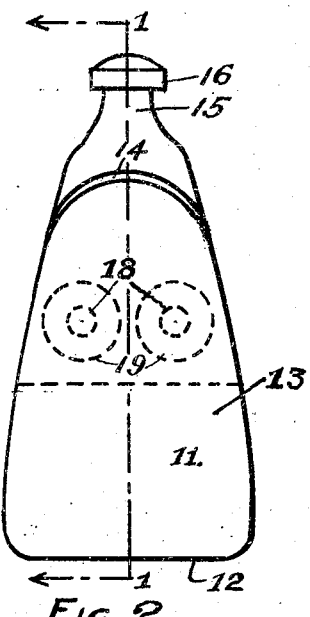

In the drawings Fig. 1 is a vertical section of one form of my artificial tooth or facing on the line 1—1 of Fig. 2.

Fig. 2 is an elevation of the same tooth or facing, looking from the left towards the right in Fig. 1.

Similar numerals refer to similar parts throughout the several views:

11 designates the main body of my artificial tooth or facing, and 12 the cutting edge thereof.

13 is the buccal or labial side of the tooth which is shown as having thereon a gingival margin 14.

The body 11 of my artificial tooth or facing terminates in a root 15, which is shown in the drawings as situated at the upper end of the tooth, when the latter is an upper tooth; in lower teeth the position of the root 15 will be reversed.

In my artificial tooth or facing the root 15 has the form of a projection or pin, which has thereon a head 16, whereby said root or pin 15 may be anchored in a plate or backing of a denture.

The head 16 is preferably made integral with said root or pin 15, which in its turn is preferably made integral with the main body 11 of my artificial tooth or facing.

All of the above mentioned parts are preferably made of porcelain.

The lingual side 17 of my artificial tooth or facing is shown in Fig. 1 as having baked thereinto or made integral therewith one or more pins 18, which I prefer to make of porcelain and to have the same baked into the main body 11 of the tooth or facing.

Any suitable process may be employed for uniting said pins 18 to said body 11.

It is evident that said pins 18, when made of porcelain, may be much larger in diameter, than if made of platinum or any other suitable metal.

Heads 19 are provided on said pins 18, and are preferably made integral therewith; the heads 19 serve for anchoring said pins 18 in a plate or backing of a denture.

The pins 18 with said heads 19, may also be made integral with said body 11, if desired.

Many changes may be made in the details of my artificial tooth or facing, without departing from the main scope of my invention, and parts of my invention may be used without other parts.

I do not therefore restrict myself to the details of my artificial tooth or facing, as shown, but I intend to include also all mechanical equivalents and obvious modifications of the same within the scope of my invention.

I claim as my invention, and desire to secure by Letters Patent:

1. An artificial tooth or facing having thereon a root, which is integral therewith, said root being formed into a projection and a head on said projection, for connecting said tooth or facing to a plate or backing.

2. An artificial tooth or facing having on the lingual side thereof a pair of circular cylindrical pins, made of porcelain, said pins being comparatively large in diameter, and said pins having thereon heads made integral therewith for connecting the same to a plate or backing.

3. An artificial tooth or facing having thereon a root, which is formed into a projection, and one or more porcelain pins on the lingual side of said tooth or facing, said projection and said pins having thereon heads, for connecting the same to a plate or backing.

4. An artificial tooth or facing, having thereon a root, which is formed into a projection, and a head on said projection, said root and said head being integral with said tooth or facing.

LAKE H. SPRINKLE.